SHIFT REGISTER STORAGE AND DRIVING SYSTEM

Filed March 1, 1963 8 Sheets-Sheet 1

INVENTOR.
RICHARD L. SNYDER,
BY
Walter J. Adam
ATTORNEY.

INVENTOR.
RICHARD L. SNYDER,
BY
Walter J. Adam
ATTORNEY.

Dec. 27, 1966 R. L. SNYDER 3,295,114

SHIFT REGISTER STORAGE AND DRIVING SYSTEM

Filed March 1, 1963 8 Sheets-Sheet 3

INVENTOR.
RICHARD L. SNYDER,
BY
Walter J. Adam
ATTORNEY.

INVENTOR.
RICHARD L. SNYDER,
BY
Walter J. Adam
ATTORNEY.

SHIFT REGISTER STORAGE AND DRIVING SYSTEM

Filed March 1, 1963 8 Sheets-Sheet 6

INVENTOR
RICHARD L. SNYDER

BY Walter J. Adam

ATTORNEY

Dec. 27, 1966 R. L. SNYDER 3,295,114

SHIFT REGISTER STORAGE AND DRIVING SYSTEM

Filed March 1, 1963 8 Sheets-Sheet 7

INVENTOR
RICHARD L. SNYDE

BY Walter J. Adam

ATTORNEY

Dec. 27, 1966 R. L. SNYDER 3,295,114

SHIFT REGISTER STORAGE AND DRIVING SYSTEM

Filed March 1, 1963 8 Sheets-Sheet 8

INVENTOR.
RICHARD L. SNYDER

BY Walter J. Adam

ATTORNEY

United States Patent Office 3,295,114
Patented Dec. 27, 1966

3,295,114
SHIFT REGISTER STORAGE AND DRIVING SYSTEM

Richard L. Snyder, Fullerton, Calif., assignor to Hughes Aircraft Company, Culver City, Calif., a corporation of Delaware Filed Mar. 1, 1963, Ser. No. 262,004
11 Claims. (Cl. 340—174)

This invention relates to magnetic memory systems and particularly to a high density magnetic shift register system having improved and simplified driving and writing arrangements.

In digital computer operation storage of great numbers of binary bits generally requires bulky and complicated equipment. Storage systems utilizing the principle of establishing a series of magnetic regions or domains in an elongated medium and propagating the magnetic domains therethrough have been found to be simplified and highly reliable. Systems of this type are subject to high speed operation because mechanical motion is not required and because lack of inertia allows rapid stopping and starting. The magnetic domains in these systems have previously been required to be reltively long in order to be permanently retained in the elongated medium during periods when no external propagating field is applied. A simpified shift register system in which very short magnetic domains are utilized and permanently maintained would provide a greatly improved high density memory system. Also, previous shift register systems require a bidirectional writing current for recording magnetic domains of desired polarities. An improved arrangement would require recording current to flow in a single direction.

It is therefore an object of this invention to provide a memory system for permanently storing magnetic regions or domains in an elongated medium with a high density.

It is another object of this invention to provide a simplified and improved driving or propagating arrangement for a shift register memory system.

It is still another object of this invention to provide a shift register memory system utilizing a simplified and improved recording arrangement.

It is a further object of this invention to provide an improved shift register system that allows permanent storage of very short magnetic domains without the presence of electrical sources of driving current.

Briefly, in accordance with this invention a shift register memory system includes an elongated magnetic medium such as a wire or a pair of wires arranged adjacent to a polyphase driving array. Also adjacent to the magnetic storage medium is a permanently magnetized medium for providing permanent magnetic fields which are the same as those during one portion of a polyphase propagating cycle. The permanent magnetic field medium may be in the form of a wire or a plate, for example. By always terminating a propagation operation at this portion of the cycle provided by the magnetized propagating medium, the system stores very short magnetic domains without the presence of propagating currents. Because of the fields provided by the permanently magnetized storage medium, unidirectional propagating currents are applied to the polyphase driving array to overcome the permanent field at selected times, allowing the utilization of relatively simplified driving circuitry. Also, in accordance with this invention, a simplified unidirectional current recording system is provided by utilizing a recording magnet for establishing magnetic domains of one polarity relation.

The novel features of this invention, as well as the invention itself, both as to its organization and method of operation, will best be understood from the accompanying description taken in connection with the accompanying drawings, in which like characters refer to like parts, and in which.

Figure 1:
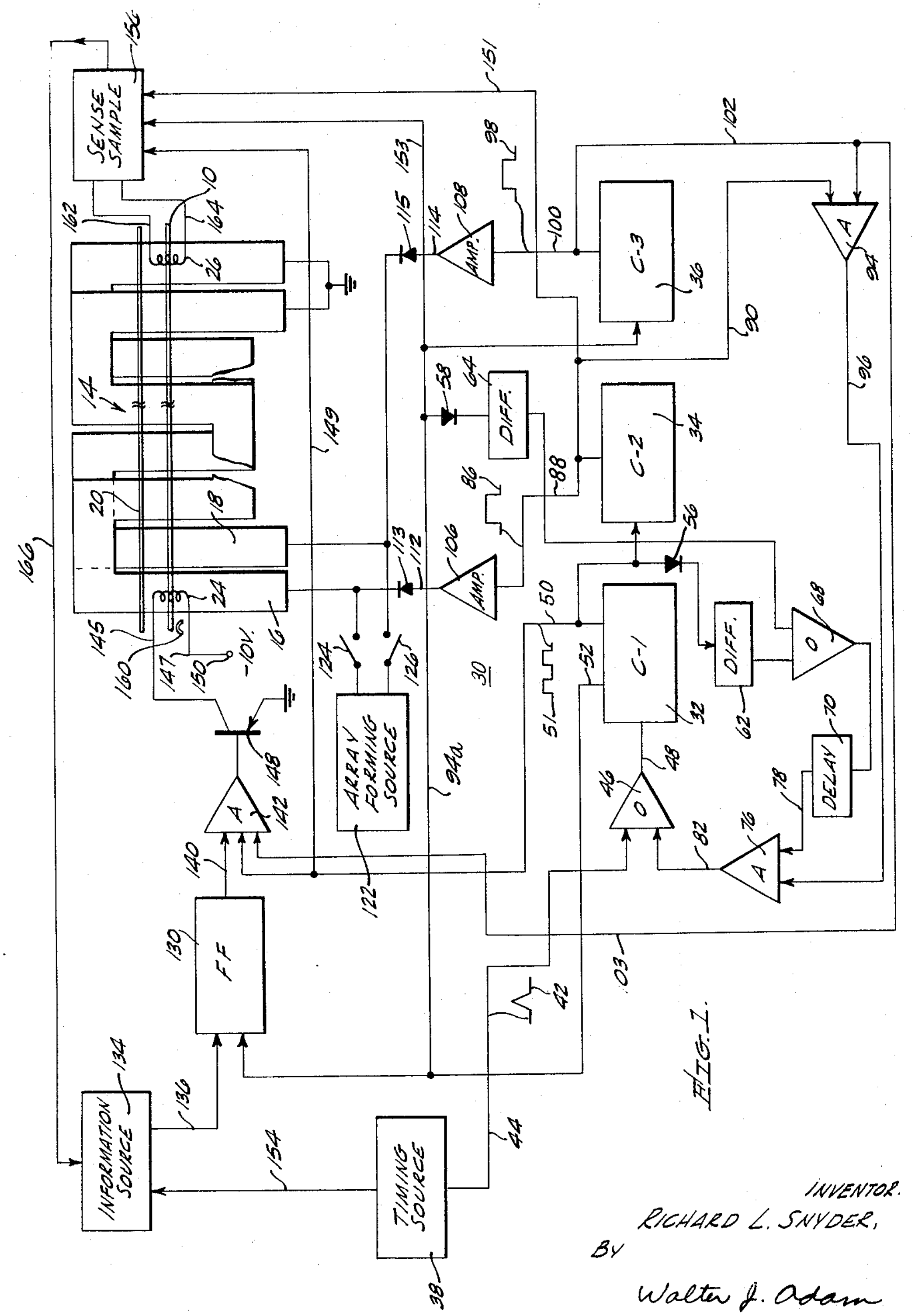
FIG. 1 is a schematic circuit and block diagram of a configuration of the shift register system in accordance with this invention.

Referring first to the system of FIG. 1, the shift register includes an elongated magnetic medium or wire 10 of a suitable magnetic material having a relatively low coercivity. Positioned below or adjacent to the magnetic wire 10 is a polyphase driving array 14 including conductors 16 and 18 arranged in a conventional staggered configuration. A field forming wire 20 of a relatively high coercivity magnetic material is positioned adjacent to the wire 10 and is permanently magnetized in a predetermined manner. As will be explained subsequently, the two phase driving array 14 utilizes a four part cycle and the permanent field of the wire 20 provides the driving fields of one part of the cycle in the absence of any driving current to the conductors 16 and 18.

In order to establish magnetic domains in the magnetic informational wire 10, a record or write coil 24 is positioned adjacent and magnetically coupled to a first end of the wire 10. As will be explained subsequently, magnetic domains are established in the wire 10 of selected polarity relations alternately representing an informational domain and a separating reference domain and serially propagated through the wire 10 to the other end thereof. For example, the reference domain and a binary "zero" informational domain may be of a first magnetic polarity and a binary "one" informational domain may be of a second magnetic polarity. It is to be noted at this time, that the magnetic wire 10 may be maintained under a constant stress such as an axial or longitudinal tension below the yield point thereof for reliable propagation of magnetic domains through long lengths of the magnetic wire 10. As the serially adjacent domains are usually alternately a reference domain of a first polarity and an informational or digit domain of a selected first or second polarity, a domain wall is only established between two adjacent domains of opposite polarity of a reference domain and a "one" domain. A domain wall is not established between a reference domain and a "zero" informational domain. It is to be noted at this time that the assurance of an external sustaining field of the wire 20 always being present as long as information is to be retained, permits the use of very short domains which may be one half of the minimum allowable length of domains when a sustaining field is not always present. This condition of short domains is desirable because it not only doubles the storage capacity of a given length of storage wire such as 10, but also permits the system to operate at twice the information rate. A sense or read coil 26 is adjacent or magnetically coupled to the opposite end of the magnetic wire 10 to respond to the presence or absence of a magnetic domain wall propagated past the coil conductors.

A driving source 30 includes first, second and third counters 32, 34 and 36 also respectively indicated as counters C–1, C–2, and C–3. Each counter 32, 34 and 36 is a conventional circuit that responds to an input trigger pulse to change the binary state thereof until another input pulse is applied thereto.

A timing source 38 applies trigger or shift pulses of a waveform 42 through a lead 44 to an "or" gate 46 and in turn, through a lead 48 to a trigger input of the counter 32. In response to the trigger pulse, the counter 32 develops pulses of opposite polarity on output leads 50 and 52 each of which is applied through respective diodes 56 and 58 to positive differentiating circuits 62 and 64. In response to the rise of the counter pulses on the leads 50 or 52, differentiated pulses are applied from the differentiating circuits 62 or 64 to an "or" gate 68 and through a delay circuit 70 which may be a conventional delay line, for example. A delayed signal is applied from the delay line 70 through a lead 78 to an "and" gate 76 which in turn is coupled through a lead 82 to the "or" gate 46 for also triggering the counter 32. When the permanent magnet fields are used in accordance with the invention, it is clear that a complete propagating cycle must be executed before stable conditions are reestablished. Thus the differentiated pulses from the leads 50 and 52 are delayed and fed back to retrigger the counter 32 through an "or" gate shared with the input pulse of the waveform 42. Three of these differentiated trigger pulses follow the initiate pulse. At the end of the cycle the system must stop unless a new initiate pulse is applied. Therefore, a method for inhibiting the circulation of the feed back pulses is provided by negative "and" gate 94.

The counter circuit 34 responds to the signal of a waveform 51 on the lead 50 to develop a pulse of a waveform 86 on a lead 88. The pulse on the lead 88 is applied through a lead 90 to the negative "and" gate 94 and through a lead 96 to the "and" gate 76. The negative "and" gate 94 develops a negative inhibiting signal when a complete four phase cycle has been completed. The pulse developed by the counter 32 on the lead 52, which is an inverted form of the waveform 51 is applied through a lead 94*a* to the counter 36 to develop a pulse of a waveform 98 on a lead 100 in response to the voltage rises of the pulses on the lead 52. The pulse on the lead 100 is applied through a lead 102 to the "or" gate 94. The pulses of the waveforms 86 and 98 are at one half of the frequency of the pulse of the waveform 51 and because the pulses of the waveforms 86 and 98 are developed in response to the signal of the waveform 51 and an inverted form thereof, the pulse of the waveform 98 lags the pulse of the waveform 86 by half of the width thereof so that the pulses are 90 degrees out of phase from each other. As may be seen in FIG. 4, both of the pulses of the waveforms 86 and 98 are at a low level at time $T_4$ and a negative signal is applied to the "and" gate 76 from the negative "and" gate 94 to prevent the counter 32 from being triggered until the cycle is again started by a shift pulse of the waveform 42.

Figure 4:
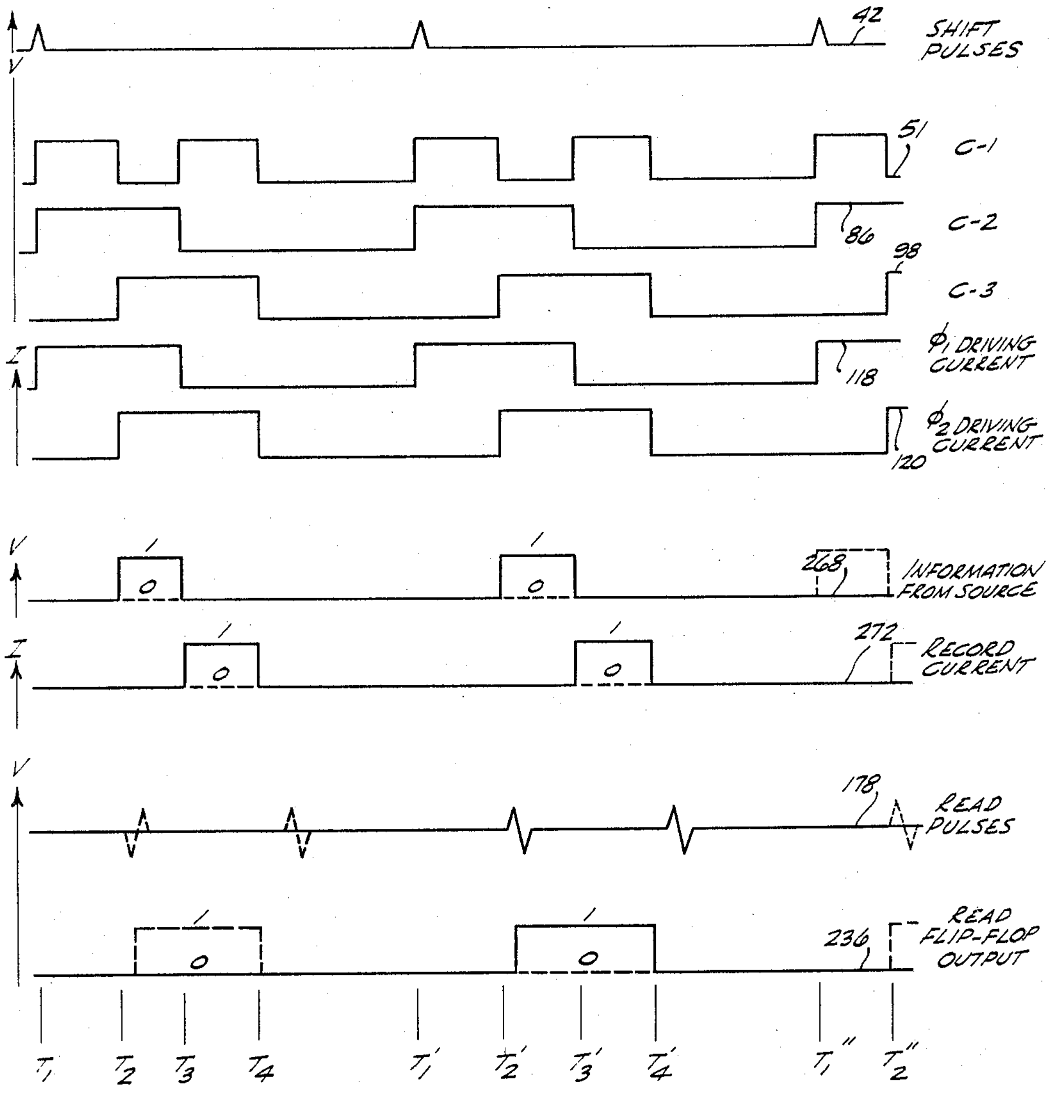
FIG. 4 is a diagram of waveforms for explaining the operation of the systems in accordance with the invention.

The driving pulses of the waveforms 86 and 98 are applied through power amplifiers 106 and 108 and through leads 112 and 114 to respective conductors 16 and 18 as first and second phase current driving pulses 118 and 120 (FIG. 4). Diodes 113 and 115 may be included in respective leads 112 and 114. Thus, two phase magnetic propagating fields are applied to the magnetic wire 10. As will be explained subsequently, an array forming source of current 122 is coupled through switches 124 and 126 to respective leads 112 and 114 to initially develop permanent magnetic fields in the driving or permanent field forming wire 20.

An input flip flop 130 responds to binary informational signals applied from an informational source 134 through a lead 136 to apply a write control pulse representing a binary "one" or the absence of a pulse representing a binary "zero" through a lead 140 to an "and" gate 142. In coincidence with a pulse on the lead 50 of the waveform 51 and the signal on the lead 100 of the waveform 98, a negative pulse is applied from the "and" gate 142 to the base of a pnp type driver or writing transistor 148 having an emitter coupled to ground and a collector coupled to a first end of the write coil 24. A second end of the write coil 24 is coupled through a lead 147 to a suitable source of potential such as a −10 volt terminal 150. In order to reset the input flip flop 130, the count signal on the lead 52 is applied to the other input lead of the flip flop. The informational source 134 is synchronized by a timing signal similar to the waveform 42 applied thereto through a lead 154. A domain forming magnet 160 is positioned adjacent to the magnetic wire 10 and prior to the read coil 24 when propagating from left to right to establish the reference and informational domains which are of one of the two polarities. Thus, unidirectional current is only applied to the read coil 24 from the transistor 148 for writing a binary "one," for example.

A sense amplifier 156 is coupled through leads 162 and 164 to the read or sense coil 26 to respond to magnetic domain walls being propagated thereby. In order to reset a flip flop in the sense amplifier 156, the signal of the waveform 51 is applied thereto through a lead 149 and signals on the leads 88 and 52 are applied thereto through respective leads 151 and 153. A binary informational signal is applied from the sense amplifier 156 through a lead 166 to the informational source 134 to be processed or recirculated, for example.

Figure 2:
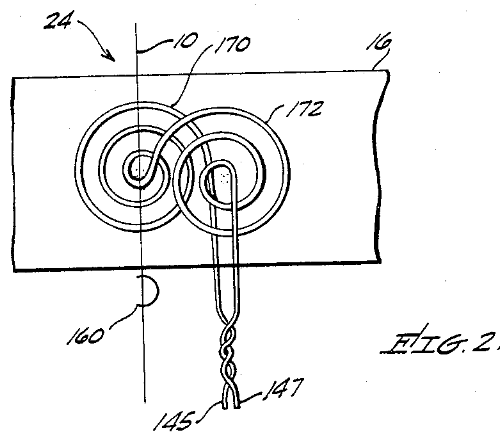
FIG. 2 is a plan view of a record and write coil that may be utilized in the system of FIG. 1 in accordance with the invention.

Referring now to FIG. 2, the write coil 24 and the sense coil 26 may include first and second spiral coil sections 170 and 172 with the coil section 170 having an outer end coupled to the lead 145 and the inner end coupled to the outer end of the coil section 172. The inner end of the coil section 172 is coupled to the lead 147. Thus, the coil sections 170 and 172 are wound in opposite directions to cancel undesired signals induced therein by the magnetic propagating fields. The wire 10 may be positioned above the coil 170 to respond to the magnetic write fields developed therein. The record magnet 160 is positioned adjacent to the magnetic wire 10 to continually establish magnetic domains therein of a fixed polarity. The arrangement of FIG. 2 is also utilized for the read coil 26. Undesired signals developed by the propagating fields are cancelled by the winding arrangement of the coils 170 and 172 so as to substantially eliminate erroneous triggering of the sense amplifier 156.

Figure 3:
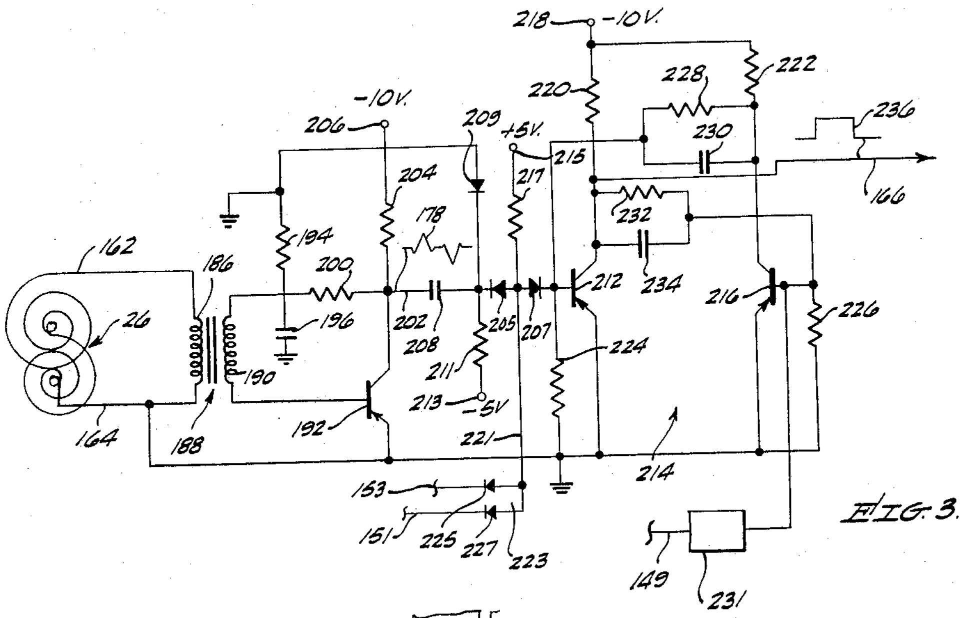
FIG. 3 is a schematic circuit diagram of the sense amplifier of FIG. 1.

Referring now to FIG. 3, the arrangement of the sense amplifier 156 will be explained before further considering the operation of the system of FIG. 1. As may be seen in FIG. 6, a series of magnetic domains is established in the wire 10 and propagated sequentially past the read coil 26. A pair of domain walls occur only when a binary "one" is present, being of opposite polarity from a reference domain. The moving domain wall induces a pulse similar to a waveform 178 in the sense coil 26 representing an interrogated binary "one." One end of the sense coil 26 is coupled to ground through a lead 164 and the other end is coupled through a lead 162 to a winding 186 of a transformer 188. A winding 190 of the transformer 188 has a first end coupled to the base of a pnp type transistor 192 which in turn has an emitter coupled to ground. The other end of the winding 190 is coupled to ground both through a biasing resistor 194 and a by-pass capacitor 196 as well as being coupled to a resistor 200. The other end of the resistor 200 is coupled to a lead 202 which in turn is coupled through a resistor 204 to a suitable source of potential such as a −10 volt terminal 206. The lead 202 is coupled through a capacitor 208, the cathode to anode path of a diode 205 and the anode to cathode path of a diode 207 to the base of a pnp type transistor 212 of a flip flop 214. The cathode of the diode 205 is coupled to ground through the cathode to anode of a clamping diode 209 and through a resistor 211 to a suitable source of potential such as a −5 volt terminal 213. The anodes of the diodes 205 and 207 are coupled through a resistor 217 to a suitable source of potential such as a +5 volt terminal 215 as well as to a lead 221. In order to pass only the first pulse of the waveform 178 to the base of the transistor 212, an "and" gate 223 is provided including diodes 225 and 227 having anode to cathode paths coupled between the lead 221 and the respective leads 153 and 151. The emitter of the transistor 212 is coupled to ground. A pnp type transistor 216 is also included in the flip flop 214 with an emitter coupled to ground. The collectors of the respective transistors 212 and 216 are coupled to a suitable source of potential such as a −10 volt terminal 218 through respective resistors 220 and 222 and the bases are coupled to ground through respective resistors 224 and 226. The base of the transistor 212 is also coupled to the collector of the transistor 216 through a control circuit including a parallel coupled resistor 228 and a capacitor 230 and the base of the transistor 216 is coupled to the collector of the transistor 212 through a control circuit including a parallel coupled resistor 232 and a capacitor 234. An output binary signal of a waveform 236 is applied to the lead 166 from the collector of the transistor 212. In order to reset the flip flop 214 at time $T_4$ of FIG. 4, a differentiating circuit 231 is coupled to the base of the transistor 216 and is responsive to the signal of the waveform 51 on the lead 149.

Referring now to FIG. 1 and to the waveforms of FIG. 4, the operation of the polyphase driving operation will be explained in further detail in accordance with the invention. In response to the shift pulse of the waveform 42 at time $T_1$ the counter 32 forms a positive pulse of the waveform 51 on the lead 50 which is applied to the counter 34. Because the counter 34 only responds to the rise of the pulses of the waveform 51, the pulse of the waveform 86 at one half of the frequency of the waveform 51 is developed on the lead 88 by the counter 34. At time $T_2$ in response to the positive pulse of the signal on the lead 52, which is an inverted form of the waveform 51, the counter 36 is triggered to form the pulse of the waveform 98.

In response to the leading edge of the positive pulse of the waveform 51, a differentiated pulse (not shown) is applied from the differentiating circuit 62 through the "or" gate 68 to the delay line 70. After a delay of the interval between times $T_1$ and $T_2$, the differentiated pulse is applied to the "and" gate 76. Also at time $T_2$, the positive pulse of the waveform 98 is applied through the negative "and" gate 94 to the lead 96 and coincident with the delayed pulse on the lead 78 a positive signal (not shown) is applied to the "or" gate 46. Thus at time $T_2$, the counter 32 is reset as the pulse of the waveform 51 falls to the lower level. The inverted form of the waveform 51 on the lead 52 which is a postive going pulse triggers the counter 36 at time $T_2$. The leading edge of the pulse of the inverted from of the waveform 51 is differentiated at time $T_2$ in the differentiator 64 and applied through the "or" gate 68 and delay line 70 to the "and" gate 76 at time $T_3$. Because the pulse of the waveform 98 is continuing at time $T_3$, a signal is applied from the "and" gate 76 and through the "or" gate 46 to trigger the counter 32 to form the positive pulse of the waveform 51. The counter 34 is reset and the pulse of the waveform 86 falls in potential at time $T_3$. Also at time $T_3$, the rise of the pulse of the waveform 51 is differentiated in the differentiator 62 and applied to the delay line 70. The delayed differentiated pulse is applied through the lead 78 to the "and" gate 76 at time $T_4$ and triggers the counter 32. Because the pulse of the waveform 98 falls at time $T_4$, a negative signal is applied from the negative "and" gate 94 to the "and" gate 76 to end the cycle shortly after time $T_4$.

Thus in response to the driving pulses of the waveforms 86 and 98, first and second phase driving current pulses of respective waveforms 118 and 120 are applied to respective leads 112 and 114.

Figure 5:
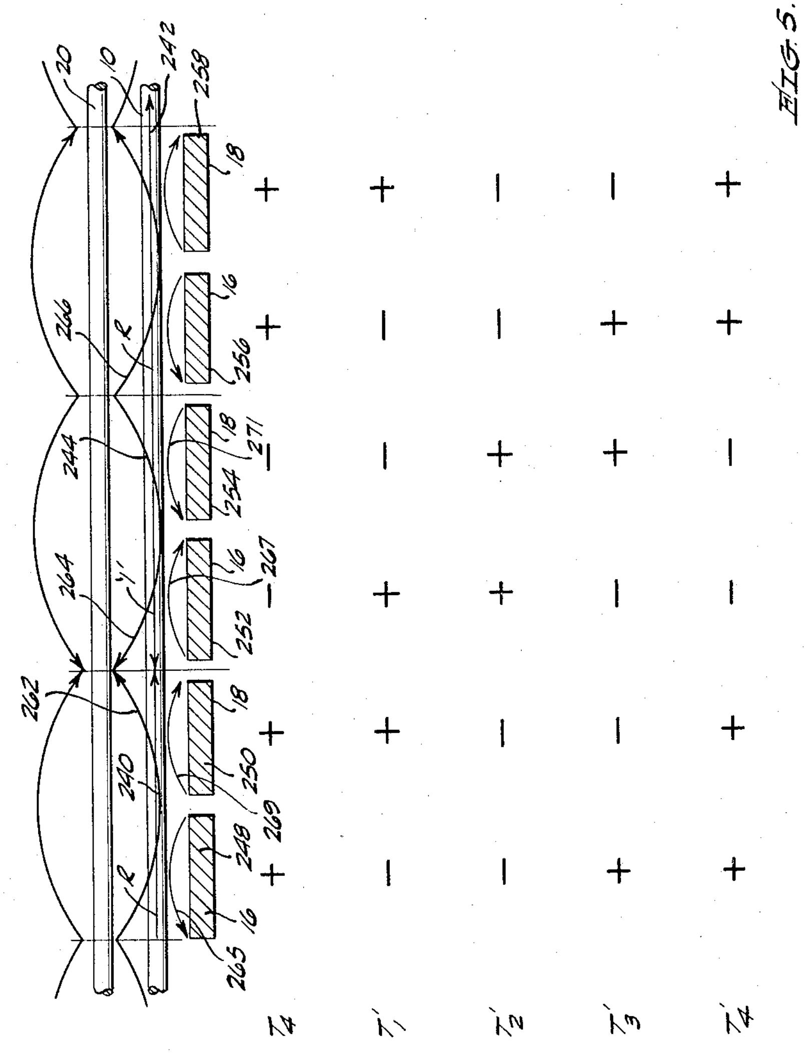
FIG. 5 is a schematic diagram for explaining the improved domain propagating arrangement in accordance with the invention.

Referring now to FIG. 5 is well as to FIGS. 1 and 4, the operation of the driving arrangement will be explained in further detail. The wire 10 is shown with reference domains of arrows 240 and 242 of a first polarity and a binary "one" domain of an arrow 244 therebetween to illustrate a propagated condition of a series of magnetic domains. These magnetic domains are established by the write coil 24 and are sequentially propagated to the right with the fixed relation and fixed length which is relatively short in accordance with this invention. It is to be noted that the relatively short domains are formed because of the narrow width of the adjacent conductors 16 and 18. As may be seen in FIG. 6, adjacent domains of the same polarity are expanded to form a single magnetic polarity region or domain indicating the presence of a binary "zero" which is of the same polarity as the adjacent reference region. However, these elongated regions are propagated forward the same as a plurality of the shorter domains except that domain walls are not at each two conductor widths. The required sequence of magnetic driving fields is provided by the directions of driving currents in the sections of the conductors 16 and 18 indicated + and − respectively representing current flowing in a direction into the cross section of the conductor and current flowing out of the section. Conductor segments 248, 250, 242 and 254 may have current directions +, +, − and − at time $T_4$, current directions −, +, +, and − at time $T_1'$, current directions −, −, + and + at time $T_2'$, current directions +, −, − and + at time $T_3'$ and current directions +, +, − and − at time $T_4'$. The sequence is repetitive and similar during the times or parts of subsequent cycles. It is to be noted that in this two phase driving sequence, a first, second, third and fourth adjacent inductor segments, the first and third conductor segments change current direction during a second time interval $T_4$ to $T_1'$, the second and fourth conductor segments change current direction at a third time interval $T_1'$ to $T_2'$, the first and third conductor segments change current direction at a fourth time interval $T_2'$ to $T_3'$ and the second and fourth conductor segments change current direction at the following time interval $T_3'$ to $T_4'$. Thus, at each time interval, the driving fields formed by two pairs, with each pair including two alternately positioned conductors, alternately change directions. Also the current directions are repeated in adjacent conductor segments such as 256 and 258. The fields resulting from this sequence of currents continually propagates the magnetic domains through the wire 10 one conductor segment width each time interval.

In order to simplify the driving arrangement in accordance with the invention, the wire 20 is permanently magnetized to provide the driving fields of times such as $T_4$ and $T_4'$, for example, as indicated by flux arrows 262, 264 and 266. After the array of FIG. 1 is assembled, the switches 124 and 126 of FIG. 1 are closed and relatively large current pulses are applied from the array forming source 122 through the conductors 16 and 18 to ground. Thus the high coercivity wire 20 is permanently magnetized throughout the length thereof as indicated by the flux arrows 262, 264 and 266 and the field driving condition of time $T_1$ is provided. The strength of the permanent fields may be selected by controlling the amount of current applied from the source 122 and by the spacing between the wires 20 and 10. Thus, as shown by the current waveforms 118 and 120 of FIG. 4, driving current is not applied to the conductors 16 and 18 at the time $T_4$ which is the condition at the end of a driving cycle. Shortly after time $T_1'$, current of the waveform 118 is applied to the conductor 16 to provide a − current direction in the conductor segment 248 and a + current direction in the conductor segment 252. The amplitude of the current pulse of the waveform 118 is selected to provide a field to cancel or reverse the adjacent permanent field of the wire 20. Magnetic fields indicated by arrows 265 and 267 in the conductor segments 248 and 252 overcome or distort the permanent fields adjacent thereto so that the established field polarity relations propagate the magnetic domains one conductor width to the right at time $T_1'$. As current is not applied to the driving conductor 18, the field adjacent thereto such as at the section 250 is provided by the permanently magnetized wire 20 joining with adjacent fields of the same polarity such as the field established by the conductor section 252. The coercivity of the field producing wire 20 or plate (FIG. 7) is established of sufficient intensity that the fields such as indicated by the arrows 265 and 267 and developed by the propagating conductors are not large enough to disturb the magnetism in the permanent section. For example, the materials utilized for the surface of magnetic drums as well as ferro-titanate materials have the required high coercivity for the permanent field producing magnets such as the wire 20 in accordance with the invention.

Shortly after time $T_2'$ the driving currents of the waveforms 118 and 120 are respectively applied to the conductors 16 and 18 and all of the fields of the permanently magnetized wire 20 are overcome and reversed. Fields of arrows 269 and 271 adjacent to the conductor segments 250 and 254 as well as the fields of the arrows 265 and 267 adjacent to the conductor segments 248 and 252 together overcome the fields of the arrows 262 and 264 and develop reversed fields. Shortly after time $T_3'$ only the driving current pulse of the waveform 120 is applied to the conductor 18 to distort the field of the wire 20 adjacent thereto so that the resultant field applied to the wire 10 is that required for propagation. The polarity of the permanent fields adjacent to the conductor 16 is retained. Also the current pulses of the waveforms 118 and 120 provide zero current shortly after times $T_4'$ which is the end of a cycle of operation. This operation continues in subsequent cycles in a similar manner. Thus in the driving arrangement in accordance with the invention, driving current is only supplied to one or both conductors during three of four time periods of a cycle. Also each cycle is terminated with the condition provided by the permanent magnetic wire 20 so that during intermittent operation current is not required except during propagation. By providing the permanent field, magnetic domains of relatively short length may be utilized and permanently maintained by the fields at the end of a cycle without driving current. It is to be noted that without a propagating field applied to the wire 10, relatively long domains are required for stability. Also it is to be noted that because the permanent field is provided by the wire 20, the array including the wires 10 and 20 may be removed from the other portions of the system in an arrangement in which information is stored on removable wire arrays. Another advantage of the driving system in accordance with the invention is that propagating current is applied to the conductors 16 and 18 in only one direction, thus simplifying the driving circuits.

It is to be noted that the fields established by the permanent magnetic wire 20 adjacent to the informational domains such as shown by the arrow 264 must be of the same polarity as the adjacent "one" domain of the arrow 244 at the end of a cycle such as at times $T_4$ and $T_4'$. The domains in the permanent field structure such as the wire 20 must always be the complement of the shift register system loaded with "ones." This is the highest energy state of the wire, that is, the greatest number of poles are present. Where fewer poles than this exist, the internal magnetomotive force of the wire 10 will be great enough to sustain the longer domains anyway. When a "zero" is stored in the position of the arrow 244 at the end of a cycle, domain walls are not present and the length of a domain region is at least three times that of a "one" condition. Thus the internal magnetomotive force of this elongated region is sufficient to support the field even though opposed to the permanent magnetic field of the arrow 264. Thus the cycle of operation must be selected so that the informational domains at the end of a cycle are adjacent to two sections of conductors that form a permanent field of the same polarity as a "one" domain.

Figure 6:
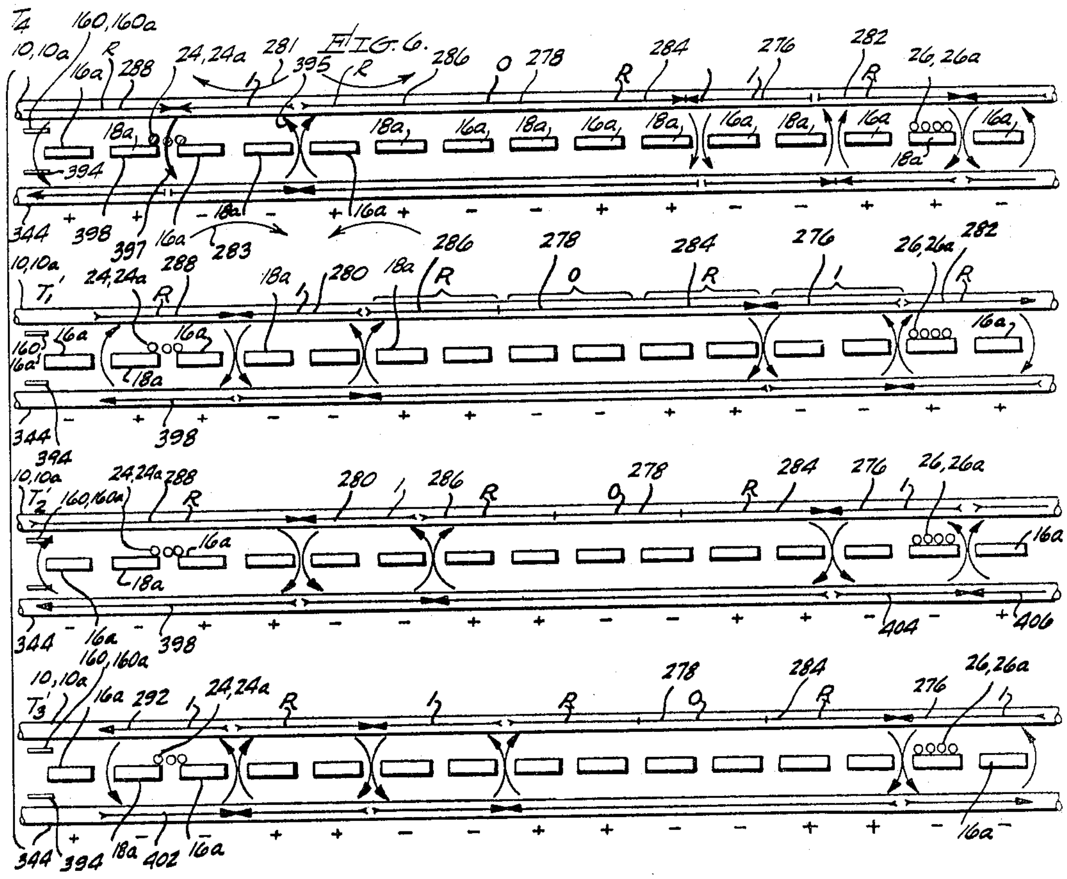
FIG. 6 is a schematic diagram for explaining the sequential operation of the shift register system in accordance with the invention.

Referring now principally to FIGS. 1, 4 and 6, the recording and sensing operation as the magnetic domains are continually propagated along the magnetic wire 10 will be further explained. For simplicity of illustration, FIG. 6 shows a complementary magnetic wire system (FIG. 7) but the operation is similar considering only the wire 10 and driving conductors 16*a* and 18*a* respectively corresponding to the conductors 16 and 18 of FIG. 1. Prior to time $T_4$ a condition has been established in the wire 10 of a binary 101 of arrow 276, arrow section 278 and arrow 280. On each side of the informational domains is a reference R domain of arrow 282, arrow sections 284 and 286 and arrow 288. At time $T_4$, the recording magnet 160 establishes the reference domain of the arrow 288 as all of the domains in the wire 10 are propagated one conductor width forward to the right. The recording magnet 160 is positioned with a polarity to establish the domains of the polarity selected for the reference domains and the "zero" informational domains. At time $T_4$, the reference domain of the arrow 282 is propagated forward but a signal is not sensed because a domain wall does not move over the sense coil 26.

At time $T_1'$, the magnetic domains are again propagated one conductor width forward and the reference domain of the arrow 288 is expanded in length. At time $T_2'$, the domain wall between the arrows 282 and 276 is propagated over the sense coil 26 and a negative and a positive pulse of the waveform 178 is sensed by the coil 26 shortly after time $T_2'$. This signal representing a sensed binary "one" is applied to the flip flop 214 (FIG. 3) of the sense amplifier 156 as controlled by the timing of the "and" gate 223 (resulting from the signals on the leads 52 and 100 going positive at time $T_2'$) and the flip flop is triggered to form the positive pulse of the waveform 236. This positive pulse is applied to the informational source 134 of FIG. 1 to be processed or recirculated as well known in the art. Also at time $T_2'$ an informational pulse of a waveform 268 is applied from the source 134 so that a binary "one" may be recorded at the next time period. A positive pulse (not shown) is applied to the lead 140.

At time $T_3'$, the magnetic domains are again propagated one conductor width forward. At the same time, a positive timing pulse of the waveform 51 is applied to the "and" gate 142 and a negative pulse is applied to the base of the transistor 148. Thus, a record current pulse of a waveform 272 is passed through the read coil 24 and a magnetic domain having a "one" polarity of an arrow 292 is established in the wire 10. The pulse of the waveform 272 is sufficiently large to apply a field of the wire 10 to overcome or cancel the opposite field of the recording magnet 160 and establish a domain of opposite polarity. Also it is to be noted that the direction of the windings of the coil 24 must be such as to provide a writing field opposite to the field of the recording magnet 160. The record coil 24 is positioned between two adjacent conductors so that a "one" is established over both conductors at the same time. The domain of the arrow 276 is propagated forward but a signal is not induced in the coil 26 at time $T_3'$. The record current of the waveform 272 may be retained until time $T_4'$ or may only occur a short interval after time $T_3$.

At time $T_4'$, the magnetic domains are again propagated one conductor width forward and as the arrow 292 moves forward a reference domain is established in the domain forming magnet 160. As the domain wall between the arrows 276 and 284 moves over or past the sense coil 26, a sensed signal of the waveform 178 is formed but is not utilized. At time $T_4'$, the signal of the waveform 51 applied to the differentiation circuit 231 of FIG. 3 resets the flip flop 214.

At time $T_1''$, as determined by the shift pulse of the waveform 42, and at times $T_2''$, $T_3''$ and $T_4''$ the magnetic domains are again propagated forward in the magnetic wire 10. At time $T_2''$ the domain wall position between the arrow portions 284 and 278 is propagated past the coil 26 and a pulse is not sensed as indicated by the solid line of the waveform 178 because of the absence of a domain wall. Thus the flip flop 214 (FIG. 3) is not triggered and a low level signal of the waveform 236 is applied to the source 134. It is to be noted that at time $T_2''$ an informational signal is not applied to the flip flop 130 as shown by the waveform 268 so that at time $T_3''$ (not shown) current is not passed through the transistor 148 and the write coil 124. Thus a "zero" is written into the wire 10 at time $T_3''$ by the recording magnet 160. A similar operation is performed during subsequent cycles such as at time $T_1''$ and $T_2''$ as well as at previous cycles such as at times $T_1$ to $T_4$.

An arrow 281 at time $T_4$ shows the polarity of the permanent magnetic field adjacent to the informational domain of the arrow 280 and of the same polarity as a "one" domain, as discussed above. The record coil 24 is positioned to cover a portion of two adjacent conductors so that a "one" domain is written the length of two conductors during one time interval such as between times $T_3'$ and $T_4'$. Thus the "one" domain is expanded both forward and backward from the write coil 24 to the position between the next adjacent forward and backward conductors. All domains are propagated with the same fixed length determined by the space of two conductors and half of the space between to the two adjacent conductors. Write current is only required for a time interval when writing a binary "one" as the recording magnet 160 forms the other magnetic polarity. Thus, in accordance with this invention, a simplified writing circuit is utilized requiring a minmum of power.

It has been found that one mil diameter wire composed of an alloy of 70 percent nickel and the balance of iron can not retain information in the absence of a propagating field when domain lengths are one eighth inch long, but will sustain the information if uninterrupted two phase currents are applied to the propagating conductors. Furthermore, this same wire will maintain non volatile storage capability, that is, reliable retention of magnetic domains, with one fourth inch long domains in the absence of propagating fields. These observations relate to a specific type of wire. It has been found that some wires under certain tension conditions will provide non volatile storage with domain lengths considerably shorter than one eighth inch, particularly with very small wire diameters. With this latter condition, even denser storage is possible than the one eighth inch domain length discussed above when a magnetic driving field is continually maintained. It is to be noted that the domain lengths in various magnetic wires are approximately in proportion to the wire diameter.

A coil coupled to a steady D.C. (direct current) source or other arrangements may be utilized instead of the recording coil 160 in accordance with the principles of the invention. Also, the invention is not limited to the particular positions of the record and sense coils shown, as other coils and positions may be selected to provide desired timing sequences in accordance with the principles of the invention. Further, it is to be noted that other types of record and sense coils may be utilized in accordance with the principles of the invention. Also, more than one read and write coil may be used on any magnetic wire in accordance with the principles of the invention.

Figure 8:
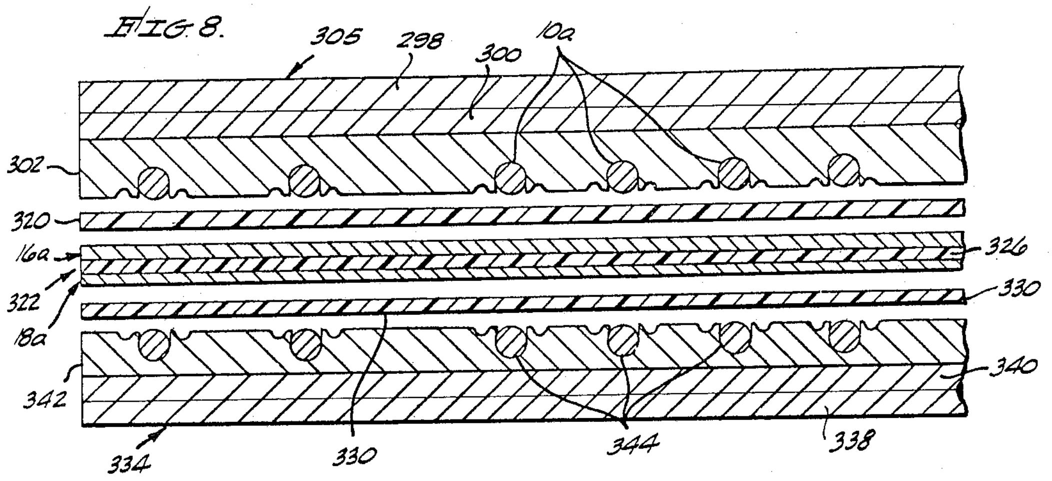
FIG. 8 is a sectional view taken at lines 8—8 of FIG. 7.
Figure 7:
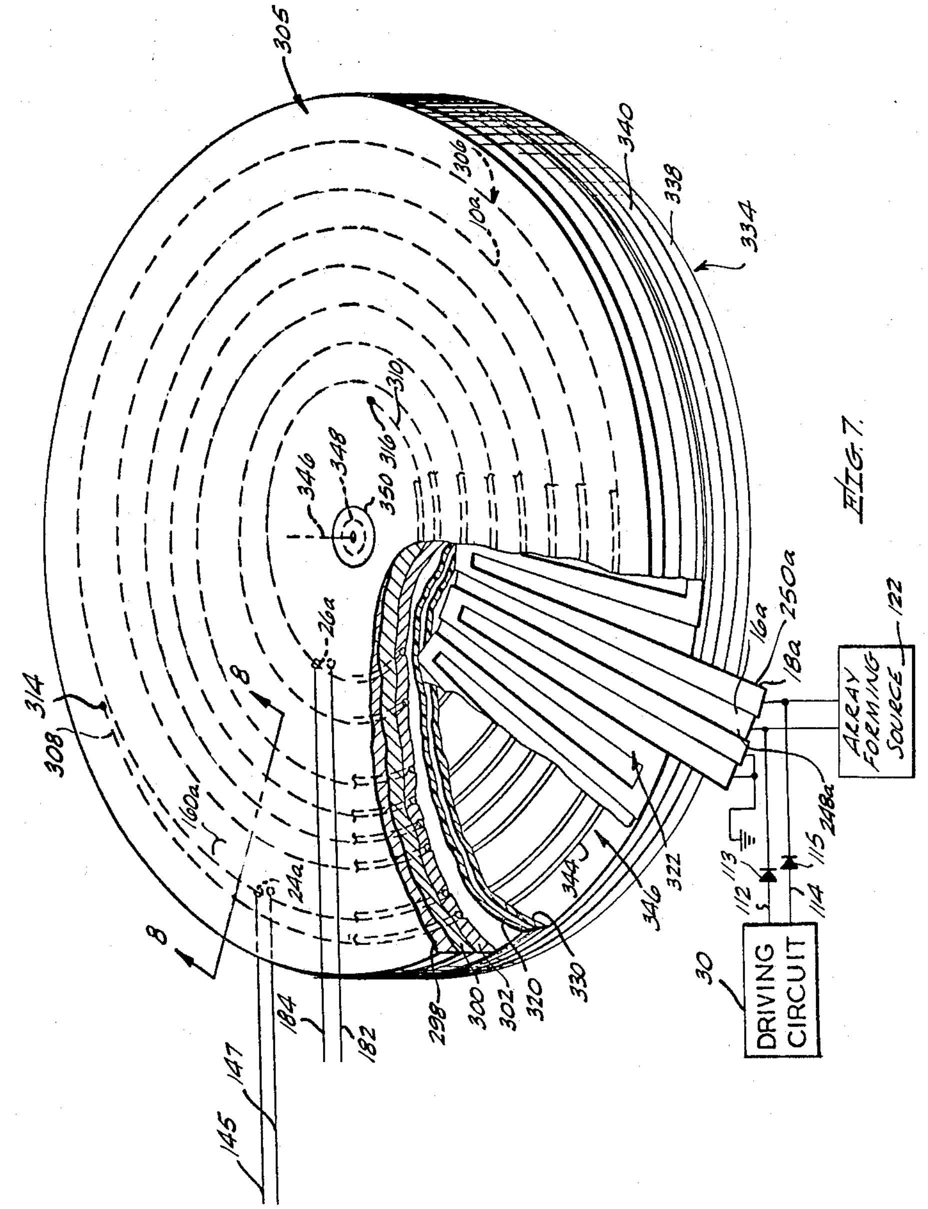
FIG. 7 is a perspective and block diagram of another arrangement of the shift register system in accordance with the invention having a spiral wire configuration and utilizing permanent field producing plates.

Referring now to FIGS. 7 and 8, another arrangement in accordance with this invention includes the magnetic wires wound in a spiral configuration. The shift register may include a circular disc arrangement 305 having a circular plate or disc 298 with a coating or film 300 of magnetic material on the lower surface thereof such as a nickel-cobalt-iron alloy having a relatively high coercivity. Coated on the film 300 is a thickness or film 302 of a soft material such as lead or epoxy for holding a magnetic wire 10*a* under a desired longitudinal tension. The magnetic wire 10*a* of a spiral winding array 306 is wound in a spiral configuration from an outer end 308 to an inner end 310. To hold the wire 10*a* under tension, suitable means such as pins 314 and 316 may be utilized at the ends thereof. It has been found that the wire 10*a* when imbedded in a conductive metallic film such as lead may be insulated with a varnish coating for a minimum of disturbance of magnetic domains during propagation. Positioned below the magnetic wires 10*a* is a thin sheet 320 of an insulating or non-conductive material such as mylar. A radial polyphase driving array 322 is positioned below the film 320 and includes conductors 16*a* and 18*a* separated by a thin film 326 of insulating or non-conducting material such as mylar which is best seen in the section of FIG. 8.

Positioned below the driving array 322 is a film 330 of an insulating or conducting material such as mylar. A second circular disc arrangement 334 similar to the arrangement 305 includes a plate 338 of material such as aluminum covered with a film 340 of a high coercivity material which may be an alloy of nickel, cobalt and iron. On top of the film 340, a film 342 is deposited of a soft material such as lead or epoxy. Positioned in the soft film 342 is a magnetic wire 344 of a spiral winding array 346. The wire 344 is wound under tension and similar to the wire 10*a* so as to be opposite therefrom throughout all of the spiral configuration.

The spiral array may have an axis 346 with holes coincident therewith and through all of the plates such as a hole 348 in the disc arrangement 305. In order to maintain the shift register array in a fixed and permanent position, a bolt 350 is positioned in the hole 348.

The circular disc arrangements 305 and 334 of the spiral shift register array of FIG. 7 may be formed by first depositing the high coercivity nickel, cobalt and iron material on a surface of the aluminum plates 298 and 338 with a selected thickness to form the respective films 300 and 340. These films of magnetic material provide the permanent magnetic fields utilized for propagation and are formed with a predetermined thickness. The coatings or films 302 and 342 of epoxy, for example, are then deposited or placed on the films 300 and 340 with a thickness which may be slightly greater than the diameter of the wires 10*a* and 344. One of the discs 305 or 334 may then be placed in a rotating mechanism similar to a lathe and the wire imbedded in the film 302 or 342 with a predetermined tension. An arrangement may be provided in which the magnetic wire such as 10*a* under tension passes around a pulley wheel having a concave circumference to hold the wire. The pulley wheel may have the axis thereof at right angles to the axis of the rotatable plate such as 298 and be selectively movable inward and outward toward the axis of the plate while pressing the wire into the soft film such as 302. A cam arrangement, for example, may respond to the rotational movement of the plate to move the pulley inward or outward so as to form a predetermined spiral configuration. Thus, the wire such as 10*a* may be pressed into the soft film 302 to permanently maintain a selected axial or longitudinal tension. It is to be noted that the configuration of the wire 344 is wound in the opposite direction from the wire 10*a* so as to be coincident and adjacent with each other when the disc arrangements 305 and 334 are positioned face to face with each other, as shown. As may be seen in FIG. 9 which shows a double wire configuration in accordance with the invention as will be explained subsequently, the first spiral wire 10*a* is wound on the plate 368 in a first direction. A second spiral wire 354, shown dotted, is wound in the opposite direction to indicate the complementary arrangement of the spiral 346 on the plate 338.

A record coil 24*a* and a sense coil 26*a* are positioned under the respective ends 308 and 310 of the magnetic wire 10*a* and are coupled to circuits similar to those of FIG. 1. The coils 24*a* and 26*a* may be similar to the coils of FIG. 2. The radial driving conductors 16*a* and 18*a* are coupled to ground at one end and to the driving circuit 30 and array forming source 122 at the other end as explained relative to FIG. 1. A recording magnet 160*a* is positioned toward the end 308 of the wire 10*a* from the record coil 24*a*. As may be seen in FIG. 6, a recording magnet 394 is adjacent to the wire 344 substantially below the recording magnet 160*a*.

Figure 10:
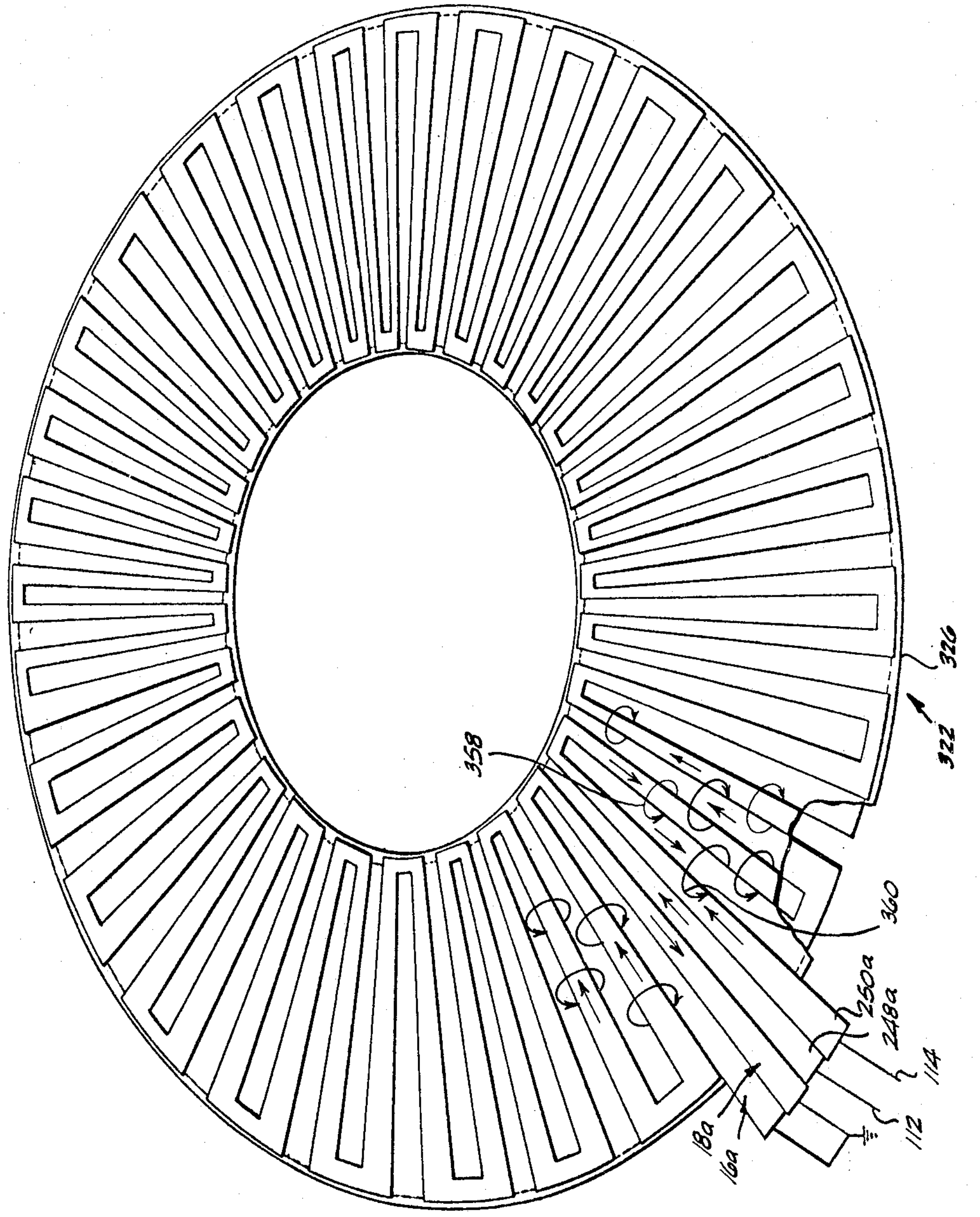
FIG. 10 is a perspective view of the radial polyphase driving array of FIG. 7.

Referring now principally to the perspective drawing of FIG. 10 and to FIG. 7, the driving array 322 is shown with the radial conductors 16*a* and 18*a* separated by the thin insulating film 326. When permanently magnetizing the high coercivity films 300 and 340, current of a selected amplitude (which is very large compared to the operating currents) is passed from the array forming source 122 to conductor sections 248*a* and 250*a* and through all the sections of the respective conductors 16*a* and 18*a* to ground. Thus the magnetic films 300 and 340 are permanently magnetized to apply the field condition indicated at time $T_4$ of FIG. 6 to the magnetic wires 10*a* and 344. Field arrows such as 358 and 360 of FIG. 10 indicate the directions of the permanent magnet forming fields of the respective conductors 16*a* and 18*a* that magnetize adjacent strips of the films 300 and 340 to permanently develop the field condition of time $T_4$, which fields are maintained except when displaced or distorted by an opposite poled field resulting from a driving current.

Figure 11:
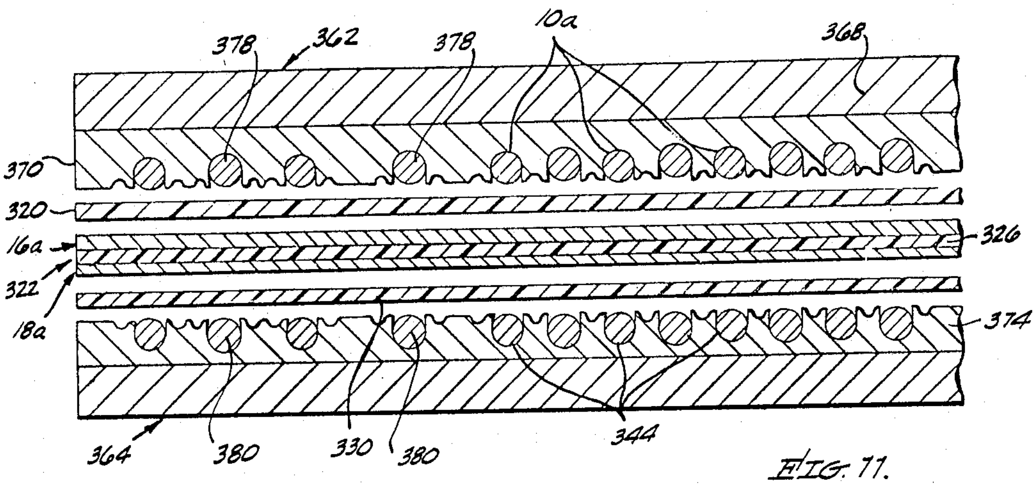
FIG. 11 is a sectional view showing an arrangement of the informational wires and the permanent field producing wires similar to that of FIGS. 7 and 8 except without the permanent field producing plates.
Figure 9:
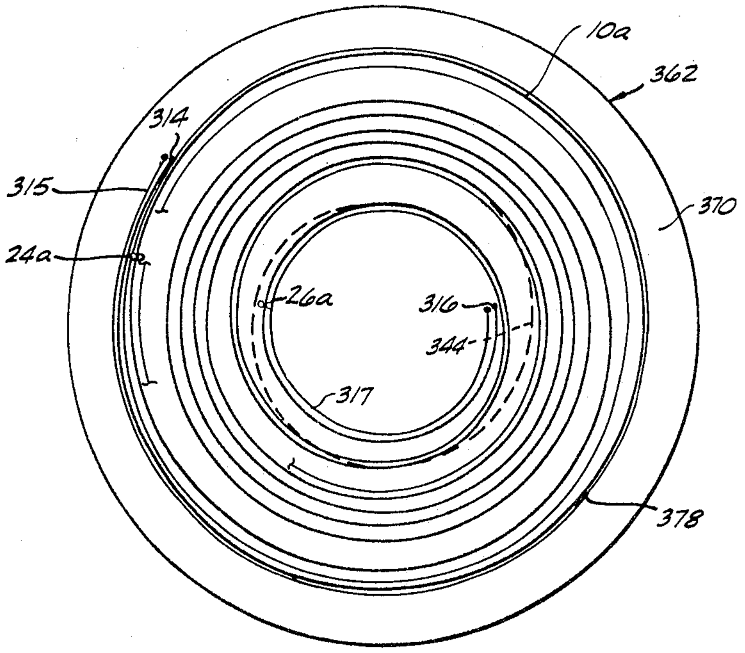
FIG. 9 is a plan view of one of the plate arrangements of FIG. 7 showing the spiral wire configuration and also showing a permanent field producing wire that may be utilized in the spiral configuration of FIG. 7 instead of the field producing plate.

Referring now to the plan view of FIG. 9 and to the sectional drawing of FIG. 11 showing another shift register arrangement in accordance with the invention. FIG. 11 may be a section through a spiral shift register such as at line 8—8 of FIG. 7 and includes elements similar to that shown in FIG. 8 except without the permanent magnetic films. The magnetic wires are designated as 10*a* and 344 in arrangement plates 362 and 364 to indicate that they are similar to the magnetic wires in the disc arrangement of FIG. 7 as previously discussed. The conductors 16*a* and 18*a* and the insulating films 320, 326 and 330 may be similar to the arrangement discussed relative to FIG. 7. The plate arrangement 362 includes a structural plate 368 of a suitable material such as aluminum with a coating or film 370 of a soft material such as lead or epoxy on the lower surface thereof. A plate arrangement 364 is similar to the arrangement 362 with a structural plate 372 of a material such as aluminum and a film 374 of a soft material such as lead or epoxy on the upper surface thereof. Pressed into the films 370 and 374 with desired tensions are the magnetic wires 10*a* and 344 in a spiral configuration. As discussed above, the wires 10*a* and 344 may be pressed into the films 370 and 374 by a pulley wheel as the plates rotate. To provide the permanent magnetic driving field, high coercivity field forming magnetic wires 378 and 380 are positioned between the respective wires 10*a* and 344 in the form of similar spirals. The field forming wires 378 and 380 may be pressed into the respective films 370 and 374 with a pulley wheel arrangement as discussed above similar to that utilized for positioning the magnetic wires 10*a* and 314 except tension is not required.

As shown by the bottom view of the plate 362 of FIG. 9, the magnetic wire 10*a* is positioned in the film 370 in a spiral configuration and the field forming wire 378 is positioned in the film 370 in a spiral configuration adjacent to the spiral of the wire 106. The wire 378 which has ends 315 and 317 requires an extra loop at the end 317 so as to provide a field on both sides of the magnetic wire 10*a*. Pins 314 and 317 may be provided at the ends of the wire 10*a*. It is to be noted that when the magnetic wires are pressed into a soft material the pins may not be required to maintain the axial tension in the arrangements in accordance with the invention.

Figure 12:
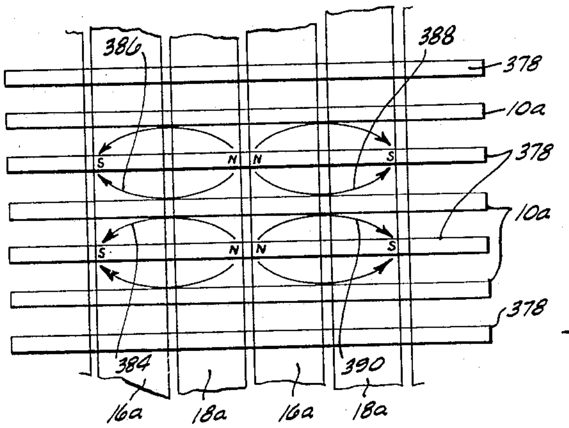
FIG. 12 is a schematic plan view for further explaining the operation of the wires in the arrangement of FIG. 11.

Referring now also to FIG. 12 which shows a plan view of the wire arrangement of FIG. 11 looking at the lower surface of the plate arrangement 362, the radial driving conductors 16*a* and 18*a* are shown in a position below the wire. Current from the array forming source 122 of FIG. 7 forms the permanent magnetic fields indicated by arrows 384, 386, 388 and 390 in the wire 378. The magnetic regions are developed in the wire 378 as determined by the directions of current flow in the conductors 16*a* and 18*a* and once formed are permanently retained. Thus, driving fields corresponding to time $T_4$ of FIG. 5 are permanently applied to the wire 10*a*. It is to be noted that current flows in the same direction through adjacent sections of the conductors 16*a* and 18*a* and a single region of magnetization is established therefrom in the field forming wire 378.

Referring now back to FIGS. 4 and 6, the operation of the shift register arrangements in accordance with the invention will be further explained utilizing two complementary magnetic informational wires as shown in FIGS. 7 and 11. At time $T_4$ the recording magnet 160*a* adjacent to the wire 10*a* and the recording magnet 394 adjacent to the wire 344 maintains the reference domain of the arrow 288 in the wire 10*a* and a complementary domain of an arrow 398 in the wire 344. It is to be noted that the polarities of the recording magnets 160*a* and 394 are reversed to form the complementary reference and "zero" domains. The driving field shown at time $T_4$ in FIG. 6 and indicated as repetitive current directions +, +, — and — are formed from the permanent magnetization of the plates 300 and 340 of FIG. 8 or the wires 378 and 380 of FIG. 11 as no driving current is applied as shown by the waveforms 118 and 120. The complementary wires 10*a* and 344 provide a substantially closed magnetic path therebetween as indicated by arrows 395 and 397. At time $T_1'$, the driving currents develop the conditions indicated in FIG. 6 as current directions —, +, + and — by developing a field from the current flowing through the conductor 16*a*. The current of the waveform 118 is sufficient to overcome or distort the permanent driving field adjacent to that conductor and develop an oppositely directed magnetic field about the information wires 10*a* and 344 during the occurrence of the current pulse. At the condition shown at time $T_1'$, the reference domain is continued as a record current is not provided so that the arrows 288 and 398 are expanded as all magnetic domains are propagated one conductor width forward.

At time $T_2'$ the current pulses of the waveforms 118 and 120 are both applied to the conductors 16*a* and 18*a* to provide driving fields opposite to the permanent driving field adjacent to both conductors as indicated by the current directions —, —, + and + in the conductor segments. As a write current pulse is not provided at time $T_2'$, the permanent recording magnets continue to expand the reference domains of the arrows 288 and 398 as all domains are propagated one conductor width forward. Also shortly after time $T_2'$ a signal similar to the waveform 178 is sensed by the read coil 26a as the magnetic walls between the arrows 276 and 282 and complementary arrows 404 and 406 move past the coil representing a previously stored binary "one." At time $T_3'$ the record current of the waveform 272 is applied to the record coil 24a and a "one" domain is recorded as indicated by the arrow 292 and a complementary arrow 402 in the conductor 344. As driving current is only applied to the conductor 18a as shown by the waveform 120, the field condition is developed as indicated by +, —, — and +. Thus, all magnetic domains in the wires 10a and 344 are propagated one conductor width forward as the "one" domain is established therein. It is to be noted that if a "zero" is to be recorded, a record current of the waveform 272 is not applied to the record coil 24a such as indicated by the dotted line of the waveform 272 at time $T_3'$. In this condition, the recording magnets 160a and 394 continue to establish reference domains.

Because the "one" domain of the arrow 292 is recorded over both the conductors 16a and 18a at time $T_3'$ by the intermediate position of the record coil 24a, the established "one" domain is maintained at time $T_4'$ and is not overcome by the recording magnets 160a and 394. However, at time $T_1''$, reference domains are established in the wires 10a and 344 by recording magnets 160a and 394.

At time $T_4'$ the magnetic domain wall of the arrow 276 passes over the read coil 26a and a signal of the waveform 178 is sensed. As discussed relative to FIG. 1, the flip flop 214 (FIG. 3) is reset at time $T_4'$. It is to be noted that if a domain wall were not present shortly after times $T_2$, $T_2'$ and $T_2''$ resulting from adjacent reference and "zero" domains of the same polarity, a pulse signal of the waveform 178 is not sensed and the flip flop 214 remains in the "zero" state indicated by the solid line at time $T_2''$. The sequence of operation at times $T_1$ to $T_4$ is similar to that discussed. The operation of the recording, sensing and the driving continues during subsequent periods in a similar manner and will not be explained in further detail. At time $T_4$ of FIG. 6, arrows 281 and 283 show the direction of the permanent magnetic field being the same as the "one" domain, as discussed above.

The double or complementary wire arrangement not only allows relatively close spacing of the magnetic wires in the spiral but stabilizes the magnetic domains so that they are relatively immune to destruction from external magnetic fields such as the driving fields.

Thus, in accordance with the invention, it has been found that when continuous propagating fields are applied to a shift register, shorter domains can be used. These shorter domains result because the continuous presence of the magnetomotive force of the propagating field reduces the reluctance of the flux path between the poles at either end of each of the magnetic domains in the informational wire. Thus, less internal magnetomotive force is required to support the poles at the domain walls. Because less internal magnetomotive force is required, a shorter length of ferromagnetic material is required for each magnetic domain. The permanent magnetic fields in accordance with the invention allow intermittent operation or permanent storage with relatively short domain lengths such as the length of a "one" domain between two reference domains.

The magnetic wires in accordance with this invention provide reliable propagation of magnetic domains through very long pieces of wire without loss or destruction of the domains. It has been found that maintaining the wires such as 10 or 10a and 344 just below the yield point provides very reliable operation without loss of domains from spreading of the domain walls. For many annealed magnetic wires, tensions between 10,000 and 60,000 pounds per square inch has been found to be required, depending on the yield point. For hard drawn magnetic wire, tensions between 4,000 and 250,000 pounds per square inch have been found satisfactory depending on the yield point of the particular wire utilized. Reliable propagation has been provided through 1,000 feet of magnetic wire. It has been found that with some wires, relatively reliable propagation with little or no tension is provided. However, because of variations of properties resulting from metallurgical problems, a substantial portion of magnetic wires obtained have regions in which propagated domains may be obliterated without the tension in accordance with this invention. The principles in accordance with this invention are not to be limited to magnetic mediums under stress or tension.

One theory of the tension feature is that the crystals in the wire rotate in alignment or balance to complement each other axially so that magnetic axial propagation is enhanced. A high degree of magnetic orientation is produced in the direction of motion of the domain walls. Polishing of the wires not only provides a desired small diameter but removes nicks and imperfections in the wire which may disturb the propagating domains by forming poles between domain walls. Poles should only exist at the domain walls.

Thus, the magnetic medium or wire must be highly oriented parallel to the direction of wall motion as may be provided by the axial or longitudinal tension. Under these circumstances the movement of a domain wall requires much lower magneto-motive forces than would be required to establish a region of reverse polarity in a length of wire which has initially been magnetized in one direction. The rate or speed at which the wall can be moved is dependent on the amplitude of the propelling or propagating field. Consequently, the observation of a hysteresis loop on a conventional low frequency loop tracing apparatus providing wall motion in response to a sine wave, will show a square hysteresis loop wherein the coercivity is indicated to be of a value nearly as great as the peak exciting field when the latter field does not exceed the nucleation field which is the field required to establish a domain. This indication is caused by the wall being driven to the region near the end of the exciting field of the apparatus where it remains until the field has been rebuilt in the opposite polarity to the values required to cause reverse motion of the wall. It is clear that this recapture field must be nearly equal to the peak value of the field that last positioned the wall near the end of the exciting field or beyond.

When a very high frequency loop tracer apparatus is used having a relatively long sensing coil, a rounded hysteresis loop is observed because the wall cannot move fast enough to traverse the exciting coil during the time when the excitation is large enough to cause wall motion. Because of the geometrical and time or velocity effects which are necessarily present during establishment of magnetic domains in the system in accordance with this invention, the definition of the hysteresis loop has not been found to be a completely satisfactory method of specifying these magnetic properties.

The permanent driving field developed by the systems in accordance with this invention provide a magnetic field that is continuually applied to the magnetic informational wires. Operation is preferably terminated at an end of a cycle such as at time $T_4$ or $T_4'$ of FIG. 4. Thus the fields of the field producing magnets such as at the plate or wire is maintained without any driving current. By always maintaining a magnetic field on the magnetic domains, relatively short domains may be utilized. The permanent field magnets in accordance with the invention allow turning off of all current sources or removal of the storage array from the system while reliably and permanently maintaining the very short informational and reference domains. If the domains are so short that they cannot be sustained by the internal magneto-motive force such as when a permanent field is not present to aid the passage of flux through the air, domains are dissipated and disappear. Another feature in accordance with this invention is that the permanent field magnets allow driving or propagating currents to be unidirectional, thus greatly simplifying the driving circuitry. Also, in accordance with the invention, the record magnet or magnets allow use of simplified recording circuits as record current only flows in one direction for recording a binary "one," for example, with all other domains recorded by the permanent magnet. The system requires a minimum amount of power because of the utilization of the permanent driving field and the recording magnet in accordance with the invention.

Thus there has been described a shift register storage and driving system that provides high density permanent storage of information with very short magnetic domains and allows removal of the storage arrays. The system allows simplified and improved driving circuits and recording circuits to be utilized. Because of the simplified driving and recording, the system operates with a relatively small amount of power. The permanent driving fields utilized in accordance with the invention are easily and accurately formed after each array is constructed.

What is claimed is:

1. A shift register comprising a magnetic medium, recording means positioned adjacent to a first end of said magnetic medium for recording domains of a first polarity therein, a recording magnet positioned adjacent to the first end of said magnetic medium for recording magnetic domains of a second polarity therein, a driving array positioned adjacent to the magnetic medium for sequentially propagating the magnetic domains to a second end thereof, and a read coil adjacent to a second end of said magnetic medium for sensing magnetic domain walls between domains of first and second polarities passing thereby.

2. A shift register comprising a magnetic medium, recording means positioned adjacent to a first end of said magnetic medium for sequentially recording domains of a first polarity therein, a recording magnet positioned adjacent to said magnetic medium between the first end thereof and said recording means for recording magnetic domains of a second polarity therein, driving array means positioned adjacent to the magnetic medium for sequentially propagating the magnetic domains to a second end thereof, and a read coil adjacent to a second end of said magnetic medium for sensing magnetic domain walls between domains of first and second polarities passing thereby.

3. A driving system for propagating magnetic domain walls along a magnetic medium in response to a sequence of first, second, third and fourth adjacent driving fields in which alternately during four time intervals the first and third driving fields and the second and fourth driving fields are inverted in polarity comprising first and second conductors positioned adjacent to the magnetic medium, permanent magnetic means positioned adjacent to said magnetic medium for forming the first, second, third and fourth driving fields during one of said time intervals, and a source of unidirectional current pulses coupled to said first and second conductors for reversing one or more of the adjacent driving fields during the other of said four intervals.

4. A shift register utilizing the principle of shifting magnetic domains through an elongated magnetic medium in response to a four period propagating cycle of magnetic fields comprising recording means positioned adjacent to a first end of the magnetic medium for establishing magnetic domains of selected polarities, first and second propagating conductors positioned adjacent to said magnetic medium, a permanent field producing magnet positioned adjacent to said magnetic medium for providing fields of one period of the four period propagating cycle, a unidirectional source of first and second current pulses coupled to said first and second conductors for controlling the fields of said permanent field producing magnets to provide fields of the other three periods of the propagating cycle, and sensing means positioned adjacent to a second end of said magnetic medium for responding to magnetic domain walls propagated thereby.

5. A shift register comprising a magnetic medium, a recording coil adjacent to said magnetic medium substantially at a first end thereof, a recording magnet adjacent to said magnetic medium between the first end thereof and said recording coil, a plurality of field producing magnets positioned adjacent to said magnetic medium, a pair of driving conductors positioned adjacent to said magnetic medium, a source of unidirectional recording current coupled to said recording coil for forming magnetic domains of a first polarity in said magnetic medium, said recording magnet forming magnetic domains of a second polarity in said magnetic medium, a source of unidirectional driving current coupled to said pair of driving conductors for developing driving fields in combination with said field producing magnets to propagate the magnetic domains along said magnetic medium to a second end thereof, and a sensing coil positioned adjacent to said magnetic medium at the second end thereof for sensing the presence of a domain wall between adjacent magnetic domains of first and second polarities propagated thereby.

6. A shift register comprising a magnetic wire having characteristics for propagating magnetic domains therealong, a recording magnet positioned at a first end of said magnetic wire, a recording coil positioned adjacent to said magnetic wire between said recording magnet and a second end of said wire, a permanent magnetic medium positioned adjacent to said magnetic wire, said permanent magnetic medium providing one combination of propagating fields of a four period propagating cycle, a read coil positioned adjacent to the second end of said magnetic wire, first and second two phase propagating conductors positioned adjacent to said magnetic wire, a unidirectional source of two phase driving current coupled to said first and second propagating conductors for distorting the propagating fields of said magnetic medium to provide the other three driving field combinations of the four phase driving cycle, a source of unidirectional write current coupled to said recording coil for establishing magnetic domains of a first polarity, said recording magnet establishing magnetic domains of a second polarity in the absence of write current, and a read amplifier coupled to said read coil for responding to magnetic domain walls propagated thereby.

7. A shift register system comprising first and second spiral arrays of first and second magnetic wires positioned adjacent to each other, first and second radial two phase propagating conductors positioned between said first and second spiral arrays, first and second plates of a magnetic material positioned respectively adjacent to said first and second spiral arrays at the sides opposite from said propagating conductors, said first and second plates being magnetized to provide magnetic driving fields for one period of a four period propagating cycle, a write coil positioned between said first and second magnetic wires substantially at first ends thereof, first and second recording magnets positioned adjacent to the respective first and second magnetic wires between the first ends thereof and said write coil, a read coil positioned between the first and second magnetic wires at second ends thereof, a source of unidirectional driving current coupled to said first and second propagating conductors for providing fields to distort the fields of said first and second plates and provide the driving fields of the other three periods of said four period cycle, a source of unidirectional writing current coupled to said writing coil for establishing an informational domain of a first polarity, said recording magnet establishing informational domains of a second plarity and alternate reference domains of said second polarity, and read means coupled to said read coil for responding to magnetic domain walls between domains of opposite polarities propagated thereby.

8. A shift register comprising an informational magnetic wire having characteristics for propagating magnetic domains therealong, a recording magnet positioned at a first end of said informational magnetic wire, a recording coil positioned adjacent to said informational magnetic wire between said recording magnet and a second end of said wire, a permanent magnetic wire positioned adjacent to said informational magnetic wire, said permanent magnetic wire providing one combination of driving fields of a four period driving field cycle, a read coil positioned adjacent to the second end of said informational magnetic wire, first and second two phase propagating conductors positioned adjacent to said magnetic wire, a unidirectional source of two phase driving current coupled to said first and second propagating conductors for distorting said driving fields of said permanent magnetic wire to provide the other three combinations of driving fields of the four period driving cycle, a source of unidirectional write current coupled to said write coil for establishing magnetic domains of a first polarity, said recording magnet establishing magnetic domains of a second polarity in the absence of write current, and a read amplifier coupled to said read coil for responding to magnetic domain walls propagated thereby.

9. A shift register utilizing the principle of shifting magnetic domains through an elongated magnetic medium in response to a four period propagating cycle of magnetic fields comprising recording means positioned adjacent to a first end of the magnetic medium for establishing magnetic domains of selected polarities, first and second conductors positioned adjacent to said magnetic medium, a permanent field producing magnet positioned adjacent to said magnetic medium for providing fields of one period of the four period propagating cycle, a unidirectional source of first and second current pulses coupled to said first and second conductors for controlling the fields of said permanent field producing magnet to provide fields of three periods of said propagating cycle, and sensing means positioned adjacent to a second end of said magnetic medium for responding to magnetic domain walls propagated thereby.

10. A shift register system comprising first and second spiral arrays of first and second magnetic informational wires positioned adjacent to each other, first and second radial two phase propagating conductors positioned between said first and second spiral arrays, third and fourth spiral arrays of permanent field producing magnetic wires respectively positioned between the wires of said first and second spiral arrays, said first and second field producing wires being magnetized to provide magnetic driving fields for one period of a four period propagating cycle, a write coil positioned between said first and second magnetic informational wires at a selected distance from first ends thereof, first and second recording magnets positioned adjacent to the respective first and second magnetic informational wires between the first ends thereof and said write coil, a read coil positioned between the first and second magnetic informational wires at second ends thereof, a source of unidirectional driving current coupled to said first and second propagating conductors for providing fields to distort the fields of said first and second field producing wires and provide the driving fields of the other three periods of said four period cycle, a source of unidirectional writing current coupled to said write coil for establishing informational domains of a first polarity, said recording magnet establishing informational domains of a second polarity and alternate reference domains of said second polarity, and read means coupled to said read coil for responding to magnetic domain walls between domains of opposite polarities propagated thereby.

11. A shift register system comprising first and second spiral arrays of first and second magnetic informational wires positioned adjacent to each other, said first and second magnetic informational wires maintained under a selected longitudinal tension so as to have characteristics for propagating magnetic domains therethrough, first and second radial two phase propagating conductors positioned between said first and second spiral arrays, third and fourth spiral arrays of permanent field producing magnetic wires respectively positioned between the wires of said first and second spiral arrays, said first and second field producing wires being magnetized to provide magnetic driving fields for one period of a four period propagating cycle, a write coil positioned between said first and second magnetic informational wires at a selected distance from first ends thereof, first and second recording magnets positioned adjacent to the respective first and second magnetic informational wires between the first ends thereof and said write coil, a read coil positioned between the first and second magnetic informational wires at second ends thereof, a source of unidirectional driving current coupled to said first and second propagating conductors for providing fields to distort the fields of said first and second field producing wires and provide the driving fields of the other three periods of said four period cycle, a source of unidirectional writing current coupled to said write coil for establishing magnetic informational domains of a first polarity, said recording magnet establishing magnetic informational domains of a second polarity and alternately establishing reference domains of said second polarity, and read means coupled to said read coil for responding to magnetic domain walls between domains of opposite polarities propagated thereby.

References Cited by the Examiner

UNITED STATES PATENTS

| | | | |
|---|---|---|---|
| 3,060,411 | 10/1962 | Smith | 340—174 |
| 3,084,336 | 4/1963 | Clemons | 340—174 |
| 3,133,271 | 5/1964 | Clemons | 340—174 |

BERNARD KONICK, *Primary Examiner.*

S. URYNOWICZ, *Assistant Examiner.*